Feb. 19, 1952   W. C. YODER ET AL   2,586,137
LOAD WEIGHT INDICATOR
Filed Nov. 22, 1948
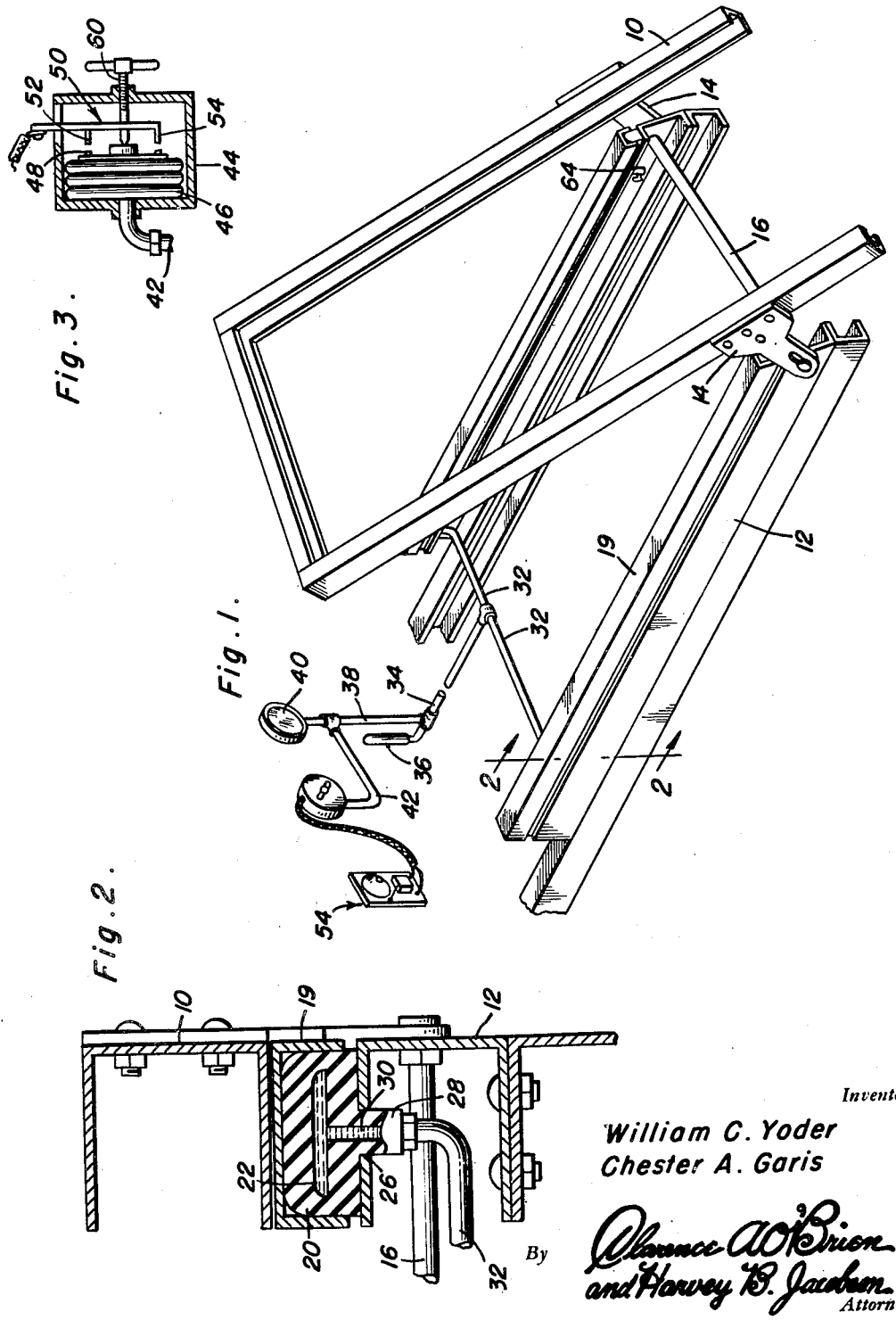
Inventors
William C. Yoder
Chester A. Garis
By
Clarence A. O'Brien
and Harvey B. Jacobson
Attorneys Patented Feb. 19, 1952

2,586,137

UNITED STATES PATENT OFFICE 2,586,137

LOAD WEIGHT INDICATOR

William C. Yoder and Chester A. Garis, Bangor, Pa.

Application November 22, 1948, Serial No. 61,344

3 Claims. (Cl. 265—40)

This invention relates to novel and useful improvements in indicating devices for use particularly with trucks.

An object of this invention is to indicate the amount of load carried by a truck by means of measuring the force between the sill and subsill of a conventional truck through the medium of a resilient member having a fluid chamber therein, and conduits connected with said fluid chamber, with both electrically operative and pressure actuated indicating means associated with said conduits.

Another object of this invention is to supply a protective guard between the sill and the resilient member, the protective guard preventing the resilient member from objectionably spreading in a lateral manner.

Another purpose of this invention is to selectively control the operation of one of the signal devices so that it will not give its warning until a predetermined load is reached.

Other objects and features of novelty will become apparent to those skilled in the art, in following the description of the preferred form of the invention, illustrated in the accompanying drawings, wherein:

Figure 1 is a perspective view of portions of a truck, having the invention applied thereto;

Figure 2 is a sectional view taken substantially on the line 2—2 of Figure 1 in the direction of the arrows; and Figure 3 is a sectional view of an improved indicator used in conjunction with and forming a part of the invention.

The specific structure of the present invention is extremely simplified. This is an essential for the adaptation of devices of this nature to be acceptable to the general purchasing and using prospective customers.

There is illustrated the vehicle usual sill 10 which is pivoted to the subsill 12 by means of the brackets 14 having the pivot bar 16 extending therethrough.

Disposed between the sill 10 and subsill 12 is a substantially U-shaped channel member 19 which partially surrounds a resilient member 20 having a chamber 22 extending longitudinally thereof. Extending through a suitable opening 26 of the subsill 12 is a sleeve 28 which is an integral part of the member 20. A passage 30 is formed in the sleeve 28 and has a conduit 32 in communication therewith.

By inspection of Figure 1 it is seen that a pair of identical conduits 32 are provided and two assemblies including the resilient members 20, guards 19 and other mechanism is supplied. The two conduits 32 and the single conduit 34 extending therefrom serve the purpose of a manifold which terminates in a surge chamber 36. However, before the surge chamber there is a pipe 38 extending from the conduit 34 which has a conventional pressure gauge 40 attached thereto. A lead 42 extends from the pipe 38 and terminates in a housing 44 (see Figure 3). It is seen that when force is applied to the sill 10, it is transmitted to the guard 19, thence to the fluid in the chamber 22 through the medium of the resilient member 20. Accordingly, fluid is forced into the conduits 32, thence into the pressure gauge 40, after the surge has been removed through the medium of the surge chamber 36. However, fluid will also be introduced into the bellows 46 which is disposed in the small housing 44 in order to expand the same. A pair of contacts 48 are secured to the bellows 44 and are movable therewith. A movable contact generally indicated at 50 and having contact members 52 and 54, respectively, is adapted to cooperate with the said contacts 48 in order to complete an electrical circuit to a signal device generally indicated at 58, which may be the bell as shown or a lamp, this being within the prerogative of the manufacturer of the invention.

The movable contact member 50 may be of any suitable design, preferably of the type which includes a threaded member 60 mounted for rotative and consequently axial movement in the housing 44, thereby moving the contact fingers 52 and 54 farther or closer selectively to the contacts 48. Accordingly, it will require more or less pressure in the bellows to bring the contact members together and thus complete the circuit. Through this means the signal 58 may be rendered operative when an objectionably large pressure is applied to the sill 10.

In order to bleed the lines and the chamber 22 of objectionable air, a conventional valve seen at 64 may be supplied at the end of one of the sleeve members 28 as seen in Figure 2. The system may be refilled with fluid at any suitable point, either by means of an additional valve type inlet or at the surge chamber 36, this being a matter of expediency.

While there has been shown and described one form of the invention which is preferable, it is apparent that variations may be made without departing from the spirit thereof. Therefore, limitation is sought only in accordance with the scope of the following claims.

Having described the invention, what is claimed as new is:

1. A pressure indicating attachment for vehicles which include a subsill and pivoted sill, a resilient member having a fluid chamber therein, a conduit extending from said fluid chamber, an indicating device supplied in said conduit, said resilient member being disposed between said pivoted sill and subsill, whereby force applied to said pivoted sill will be transmitted to said resilient member, a guard disposed on and carried by said resilient member to protect said resilient member, and said pivoted sill being vertically movable from said guard so that said resilient member is protected by said guard when said pivoted sill is pivotally raised.

2. In a vehicle which has a sill and a sub-sill, an elongated resilient member disposed on said sub-sill, said resilient member being deformable and having a longitudinal passage therein which forms a pressure chamber, a guard having downturned side flanges disposed on said resilient member, the flanges extending partially between said sill and sub-sill to prevent excessive lateral spreading of said resilient member and said guard being contacted by said sill so that when force is applied to said sub-sill it passes through said resilient member so that the resilient member is deformed and the pressure applied to said guard is transmitted to said pressure chamber, and means for indicating the value of pressure in said pressure chamber.

3. The combination of claim 1 and said guard being substantially channel-shaped in cross-section and including a top member constituting a seat for said pivoted sill together with flanges which depend downwardly, and said flanges being located on opposite sides of said resilient member to prevent excessive spreading of said resilient member.

WILLIAM C. YODER.
CHESTER A. GARIS.

REFERENCES CITED

The following references are of record in the file of this patent:

UNITED STATES PATENTS

| Number | Name | Date |
|---|---|---|
| 1,147,128 | Troll | July 20, 1915 |
| 1,227,503 | Troll | May 22, 1917 |
| 1,329,685 | Troll | Feb. 3, 1920 |
| 2,109,460 | Brasher | Mar. 1, 1938 |